(12) United States Patent
Li et al.

(10) Patent No.: US 7,472,197 B2
(45) Date of Patent: Dec. 30, 2008

(54) METHOD AND APPARATUS FOR AUTOMATIC SWITCHING OF MULTICAST/UNICAST LIVE TV STREAMING IN A TV-OVER-IP ENVIRONMENT

(75) Inventors: Qiang Li, Campbell, CA (US); Naxin Wang, Cupertino, CA (US); Li-Cheng Tai, San Jose, CA (US)

(73) Assignee: UT Starcom, Inc., Alameda, CA (US)

( * ) Notice: Subject to any disclaimer, the term of this patent is extended or adjusted under 35 U.S.C. 154(b) by 274 days.

(21) Appl. No.: 11/163,790

(22) Filed: Oct. 31, 2005

(65) Prior Publication Data

US 2007/0101012 A1     May 3, 2007

(51) Int. Cl.
*G06F 15/16* (2006.01)
*G06F 15/173* (2006.01)
*G06F 15/177* (2006.01)

(52) U.S. Cl. .......................... 709/231; 709/228; 725/97; 725/62; 370/486

(58) Field of Classification Search ......... 709/217–231; 725/97, 62; 370/486
See application file for complete search history.

(56) References Cited

U.S. PATENT DOCUMENTS

| 2006/0126667 | A1* | 6/2006 | Smith et al. ................. 370/486 |
| 2007/0094691 | A1* | 4/2007 | Gazdzinski ................... 725/62 |
| 2007/0107026 | A1* | 5/2007 | Sherer et al. .................. 725/97 |
| 2007/0168523 | A1* | 7/2007 | Jiang et al. ................... 709/228 |

\* cited by examiner

*Primary Examiner*—Haresh N Patel

(57) ABSTRACT

A system for live TV transmission over IP networks incorporates a content encoder receiving live TV broadcast and converting to RTP packets for multicast streaming. A streaming server receives the multicast RTP packets from the content encoder and converts the multicast stream to a unicast stream. The streaming server is also responsive to RTSP commands for trick mode operation. A settop box is connected through an IP network for receiving multicast RTP packets from the content encoder and generating RTSP commands for trick mode operation, the setup box issuing a leave multicast group signal upon issuing a trick mode command and receiving unicast transmission of RTP packets from the streaming server controllable by the trick mode commands.

7 Claims, 4 Drawing Sheets

US 7,472,197 B2

METHOD AND APPARATUS FOR AUTOMATIC SWITCHING OF MULTICAST/UNICAST LIVE TV STREAMING IN A TV-OVER-IP ENVIRONMENT

REFERENCE TO RELATED APPLICATIONS

This application is related to copending applications Ser. Nos. 10/826,519 entitled METHOD AND APPARATUS FOR A LOOSELY COUPLED, SCALABLE DISTRIBUTED MULTIMEDIA STREAMING SYSTEM filed on Apr. 16, 2004 and 10/826,520 entitled METHOD AND APPARATUS FOR MEDIA CONTENT DISTRIBUTION IN A DISTRIBUTED MULTIMEDIA STREAMING SYSTEM filed on Apr. 16, 2004, both applications having a common assignee with the present application, the contents of which are incorporated herein by reference.

BACKGROUND OF THE INVENTION

1. Field of the Invention

This invention relates generally to the field of distributed multimedia streaming and more particularly to distribution of live TV multicast programming using multicast and unicast methods with automatic switching to enable multiple speed trick mode functions.

2. Related Art

Broadcast of live TV programming is desirable for TV-over-IP applications. Many networks are enabled for multicast transmission to support direct streaming of the live broadcast. The most efficient approach to serve many viewers watching the same content is to stream via multicast, utilizing the built in capabilities of the network to serve many clients. However, the key new features of IPTV over traditional broadcast mode of TV viewing is the support for time shifted content and multiple speed trick mode (fast forward and rewind) which can be achieved only with unicast streams. At any given time, the contents viewed by most viewers are live TV broadcast for which multicast streaming is employed. However, viewers selecting trick mode functions desire to do so without requirements for switching system inputs or additional command selections.

Consequently, it is desirable to support multicast IP traffic while providing automatic switching to unicast streaming to enable trick modes and time shift content viewing only to the viewers employing the trick mode commands. It is further desirable that transition between multicast and unicast modes be seamless and provide the greatest efficiency in streaming mode for the overall system.

SUMMARY OF THE INVENTION

The present invention provides a system for live TV transmission over IP networks which incorporates a content encoder receiving live TV broadcast and converting to RTP packets for multicast streaming. A streaming server receives the multicast RTP packets from the content encoder and converts the multicast stream to a unicast stream. The streaming server is also responsive to RTSP commands for trick mode operation. A settop box is connected through an IP network for receiving multicast RTP packets from the content encoder and generating RTSP commands for trick mode operation, the setup box issuing a leave multicast group signal upon issuing a trick mode command and receiving unicast transmission of RTP packets from the streaming server controllable by the trick mode commands.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
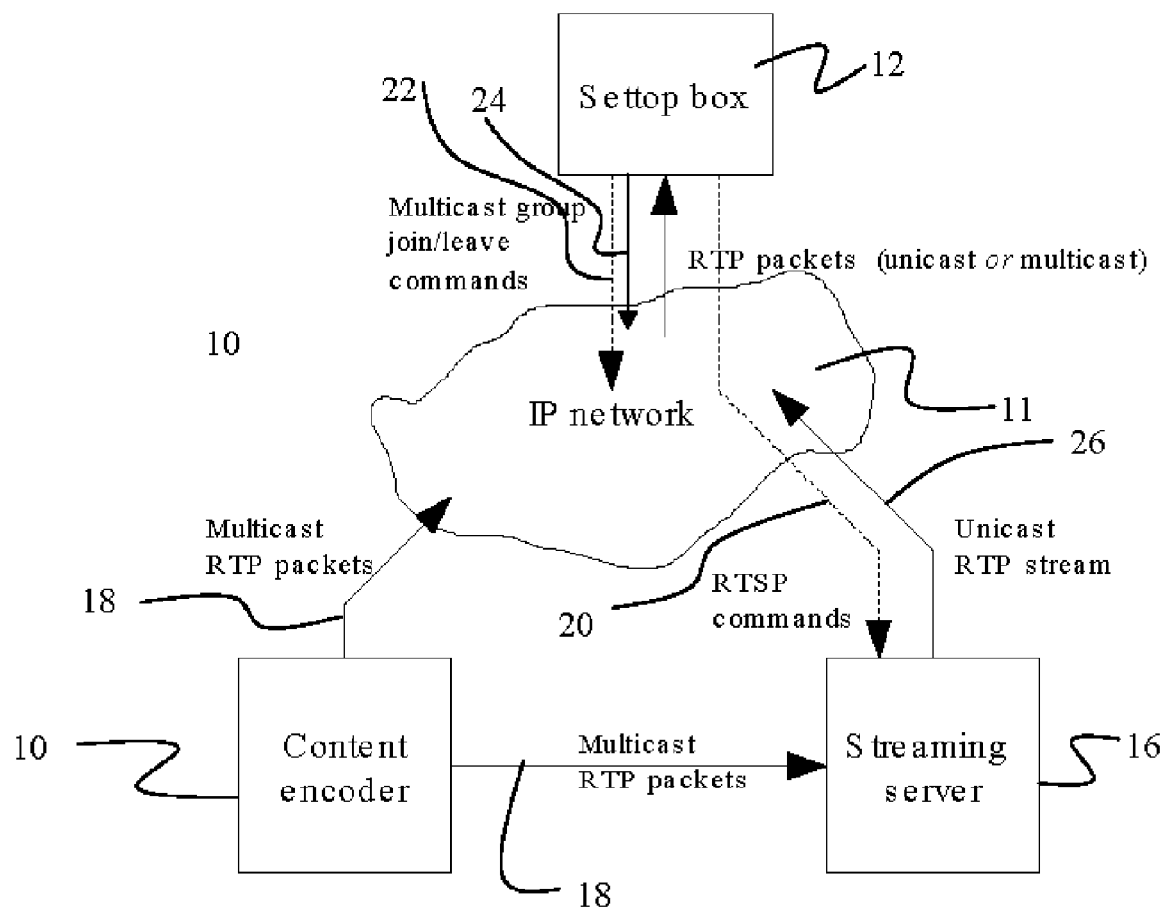
FIG. 1 is a block diagram of modules in a network system for multi-media streaming in which the present invention is employed.

FIG. 1 demonstrates one embodiment of a network system employing the present invention. The basic means to serve many viewers watching the same contents is to stream via multicast, utilizing the built in capabilities of the network to serve many clients. A content encoder 10 converts the live broadcast TV signal into RTP packets which are delivered to the IP network 11 for transmission to an exemplary settop box 12 at a user premises. The key new features of IPTV over traditional broadcast mode of TV viewing is the support for time shifted content and multiple speed trick mode (fast forward and rewind) which can be achieved only with unicast streams. At any given time the contents viewed by the most viewers are live TV broadcast. Therefore, an embodiment of the system employing the present invention uses the multicast capabilities of the IP network to serve live content. To enable trick modes and time shift content viewing when commanded by viewers, the system provide seamless transition between the multicast and unicast modes of streaming.

The stream server 16 also receives the multicast RTP packets 18 from the content encoder which include a segment number and frame number for reference. The stream server supports unicast streaming and accepts RTSP or "play" commands 20 from the settop box which can specify the starting point of the content (the frame number and the content segment number) to play, including the current "live" position if the stream is of a live TV channel, the speed of playing (normal speed, or 2, 4, 8 or 16 times the normal speed in trick modes) as well as the direction of the play (forwards. or backwards) as defined for the media engine in U.S. patent application Ser. No. 10/826,519 entitled METHOD AND APPARATUS FOR A LOOSELY COUPLED, SCALABLE DISTRIBUTED MULTIMEDIA STREAMING SYSTEM the disclosure of which is incorporated herein by reference. The stream server also has the capability to "notify" the settop box in the video stream packets about the change of state, such as reaching the current end of the recorded content (the live position for live TV streams) or the beginning of the content, allowing the settop box to respond.

With the functional primitives of the streaming server and the content encoder, the settop box can achieve the seamless transition between the multicast and the unicast play modes. For playing live TV, the settop box joins the multicast group with a join multicast group command 22 and receives the live TV content packets. Coincident with issuing any trick command such as a pause, the settop box issues a leave multicast group command 24. When the viewer desires to rewind or resume playback session after some time period of pause, the settop box issues a play command to the stream server to start streaming via unicast 26 with segment number and/or frame number to indicate the beginning of the playback session.

Then the viewer can perform the usual trick modes or pause command operations on the unicast stream. If the viewer fast forwards the stream so it "catches on" with the live TV, the stream server will notify the settop box which can then drop the unicast TV stream and rejoin the multicast network group issuing a join multicast group command with the up-to-date stream position information such as segment number and/or frame number, resuming multicast live TV playing.

The viewer can also order "time shifted" playing using any of the trick commands, starting from a point in already recorded contents. The stream will play in the unicast mode but can transition to multicast live TV if the viewer makes it "catch on" to the live TV position as in the manner described previously.

System facilities provide channel management and channel data to the settop box for the multicast IP addresses and the corresponding channel numbers for all available live channels to be able to properly switch between multicast and unicast streams from the content encoder and the streaming server respectively. In an exemplary embodiment, elements to perform the required logic include a channel meta data manager, such as the MAM and a middleware server EPG as defined in co-pendng patent application Ser. No. 10/826,519, previously referenced, to pass the meta data information to the settop box.

Figure 2A:
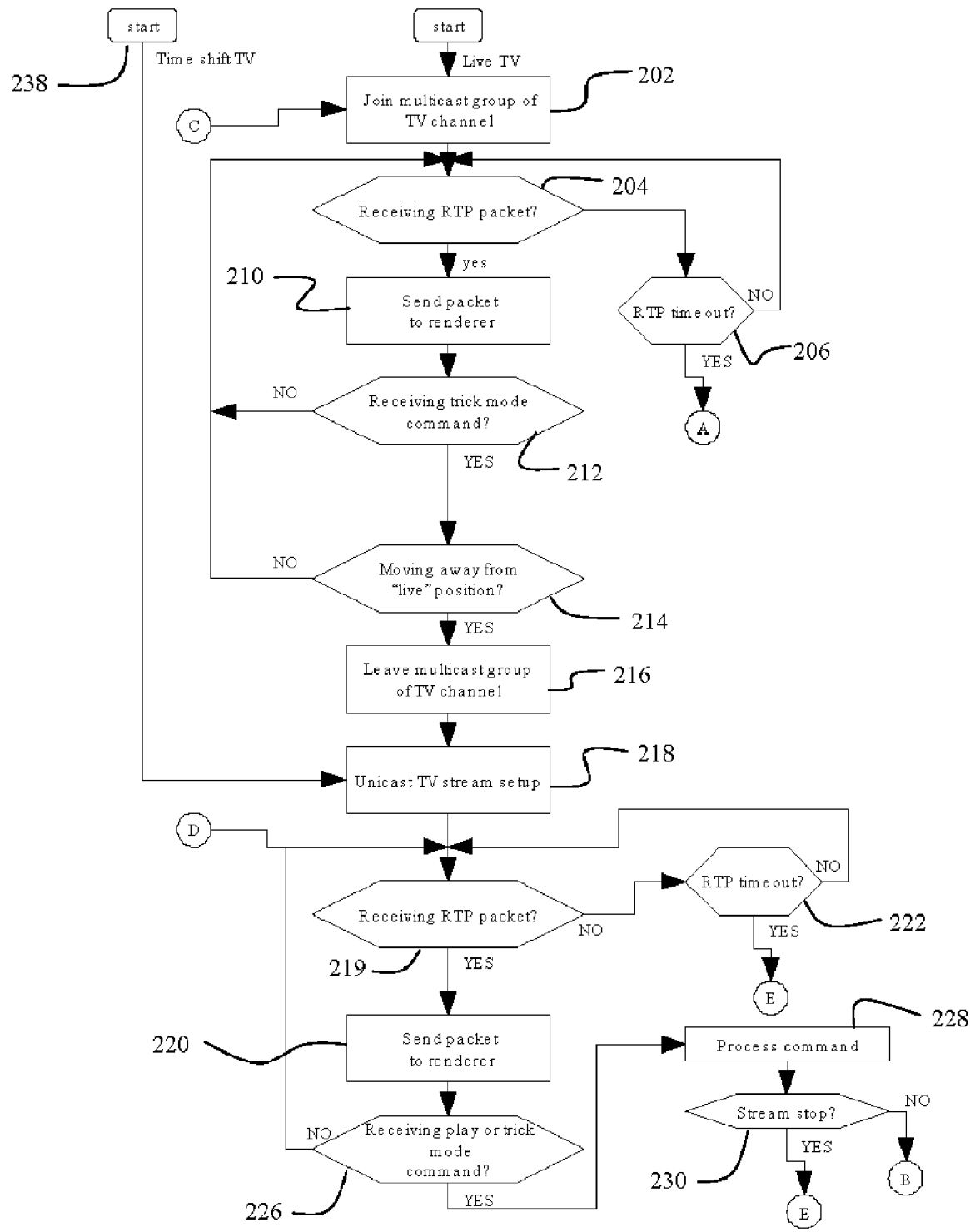
FIGS. 2a and 2b are a flow diagram of the process for operation of a streaming server incorporated with the IP network according to the present invention.
Figure 2B:
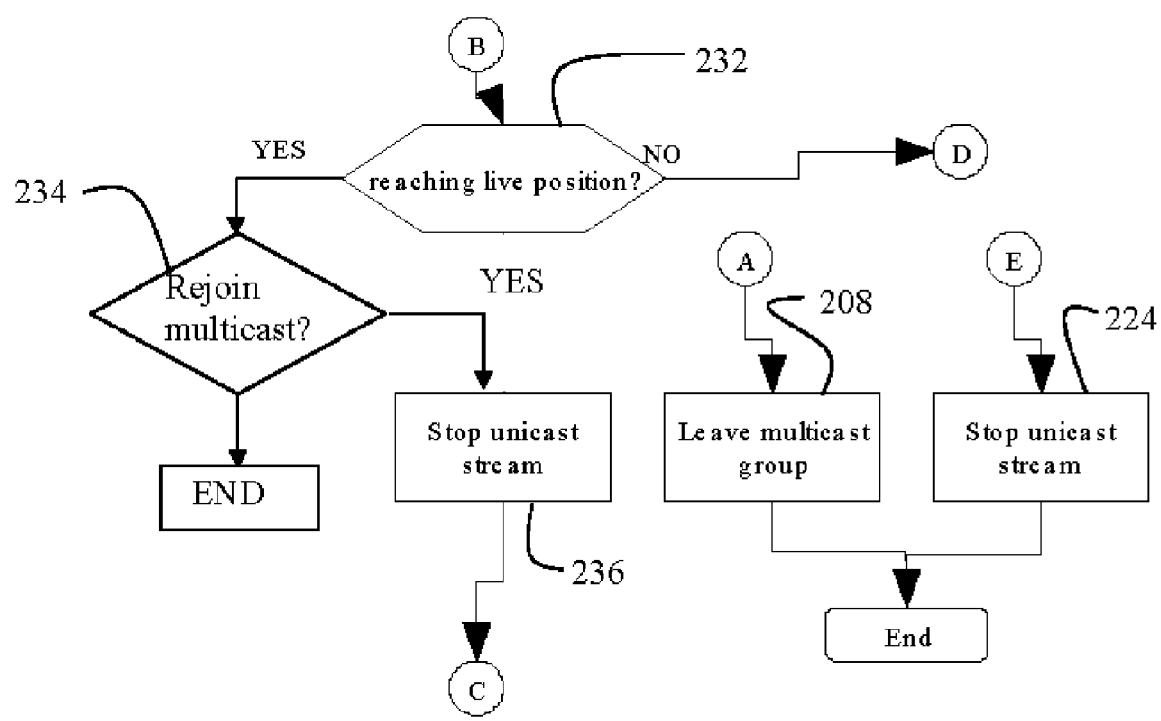

Referring to FIGS. 2a and 2b , when a new live IPTV session begins, the settop box first joins a multicast group of a live TV channel 202. The settop box reads the multicast traffic from the network receiving RTP packets 204. If the traffic times out 206, the stream ends (entry point A) and a leave multicast group command is issued 208. If RTP packets are being received, the packets are read and sent to the render hardware for display 210. This continues unless interrupted by a viewer command for different play modes. The settop box monitors for a trick mode command 212 returning to step 204 if no command is received. If a command is received, a determination is made if the command causes the stream to leave the live position (rewind, pause, etc) 214, if so, the settop box leaves the multicast group 216 and switches to the unicast mode by first establishing a stream session with the streaming server in unicast TV stream setup 218. The settop box commences receiving unicast RTP packets 219 and sends them to the rendering hardware 220, except in case of traffic timeout 222 in which the stream is aborted (entry point E) and stops the unicast stream 224. If a user command is received 226, the settop box sends the command to the streaming server which carries out the appropriate processing 228, such as changing the stream play direction (forwards or backwards) and play speed (normal play or 2, 4, 8, or 16 times the normal speed in trick modes). During processing of the command, the settop box determines if the command is a stream stop 230. If so, the settop box transitions (entry point E) to stop the unicast stream. If the command is not a stream stop (entry point B), the stream server determines if the stream has "hit" the live stream position by catching up to the live TV (by going fast forward) 232, if not, it returns (entry point D) to processing the RTP packets at the commanded location. If the stream is reaching the live position, the settop box received notification from the streaming server and the settop box then decides, at its option, to switch back to multicast or not 234. If a determination is made to rejoin multicast, the settop box first stops the unicast stream session 236 by sending a stop command to the stream server, and then rejoins the multicast group (entry point C), and the flow follows as from the start of the multicast session.

In case of the viewer starting a time-shifted IPTV session 238, the settop box starts by establishing a unicast stream 218 with the streaming server, in the manner described previously. The operation of the system in unicast mode is as previously described and the viewer can cause the switch to live TV by "catching on" to the live session position.

Figure 3:
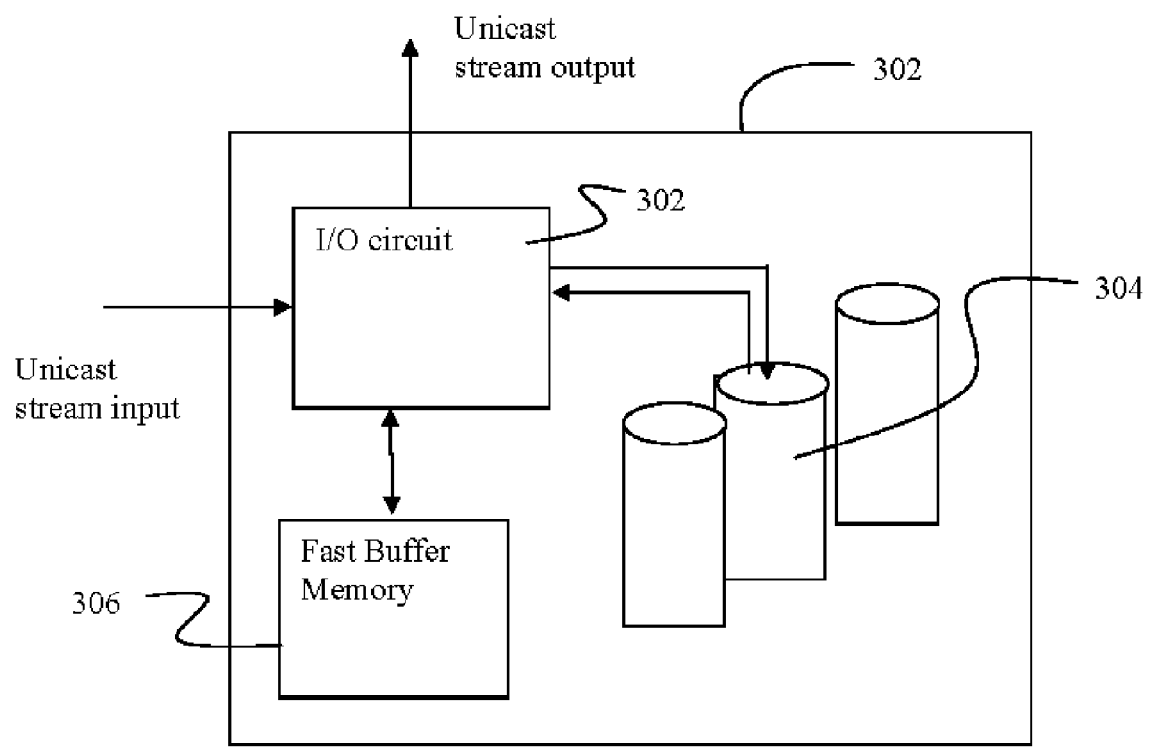
FIG. 3 is a block diagram of the elements of a streaming server according to the present invention.

The streaming server is capable of retransmitting the RTP packets as unicast streams by receiving the streams in an I/O circuit 302 and storing the video content in a special file system on its own permanent storage space (hard disks) 304 as shown in FIG. 3 so the TV viewer can watch time-shifted unicast TV.

Data stored on the permanent storage space is retransmitted by the I/O circuit to the settop box. The streaming server has also an fast-memory buffer (RAM) 306 of sufficient size to be able to efficiently cache the just captured packets from live channels (the multicast from the content encoder) to the unicast stream outgoing port to achieve unicast live TV without waiting for I/O on the slower permanent storage.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for TV transmission comprising the steps of:
  encoding live TV broadcasts as RTP packets and multicasting said packets through an IP network;
  joining a multicast group on the network to receive a live TV channel with a settop box;
  reading the multicast traffic from the network by receiving streamed RTP packets;
  when the stream ends issuing a leave multicast group command;
  when RTP packets are being received, reading the packets and sending the packets to render hardware for display;
  monitoring by the settop box for a trick mode command;
  continuing to read and send packets if no command is received;
  when a command is received, determining if the command causes the stream to leave the live position;
  if so, issuing a command through the settop box to leave the multicast group;
  switching to the unicast mode by establishing a stream session with the streaming server;
  receiving unicast RTP packets and sending them to the rendering hardware;
  communicating a reaching live position signal from the streaming server to the settop box;
  when a reaching live position signal is received bringing the unicast steam into coincidence with the multicast stream;
  when a traffic timeout occurs in which the stream is aborted, stopping the unicast stream;
  when a user command is received, sending the command to the streaming server; and
  carrying out the appropriate processing defined by the command at predefined fixed play speeds to avoid streaming of excessive data.

2. The method as defined in claim 1 wherein the step of carrying out the appropriate processing includes the steps of:
  determining if the command is a stream stop; and
  if so, stopping the unicast stream.

3. The method as defined in claim 1 wherein the step of carrying out the appropriate processing includes the steps of:
  determining if the stream has "hit" the live stream position by catching up to the live TV;

if not, returning to processing the RTP packets at the commanded location;

if the stream is reaching the live position, stopping the unicast stream session by sending a stop command to the stream server;

rejoining the multicast group.

4. The method as defined in claim 1 wherein the predefined fixed speeds are 2, 4, 8 or 16 times normal speed.

5. A system for TV transmission over IP networks comprising:

a content encoder receiving live TV broadcast and converting to RTP packets for multicast streaming;

a streaming server receiving the multicast RTP packets from the content encoder and having means for converting the multicast stream to a unicast stream, the streaming server also responsive to RTSP commands for trick mode operation with predefined fixed play speeds;

a settop box connected through an IP network for receiving multicast RTP packets from the content encoder and generating RTSP commands for trick mode operation, the settop box issuing a leave multicast group signal upon issuing a trick mode command and receiving unicast transmission of RTP packets from the streaming server wherein the streaming server communicates a reaching live position signal to the settop box for bringing the unicast steam into coincidence with the multicast stream.

6. The system for TV transmission as defined in claim 5 wherein the settop box is responsive to the reaching live position signal and issues a stop unicast transmission signal and a join multicast transmission signal.

7. The system for TV transmission as defined in claim 5 wherein the fixed speeds are 2, 4, 8 or 16 times normal speed.

* * * * *